C. N. CHOATE.
CEMENT BLOCK MACHINE.
APPLICATION FILED MAR. 12, 1907.

947,569.

Patented Jan. 25, 1910.
6 SHEETS—SHEET 2.

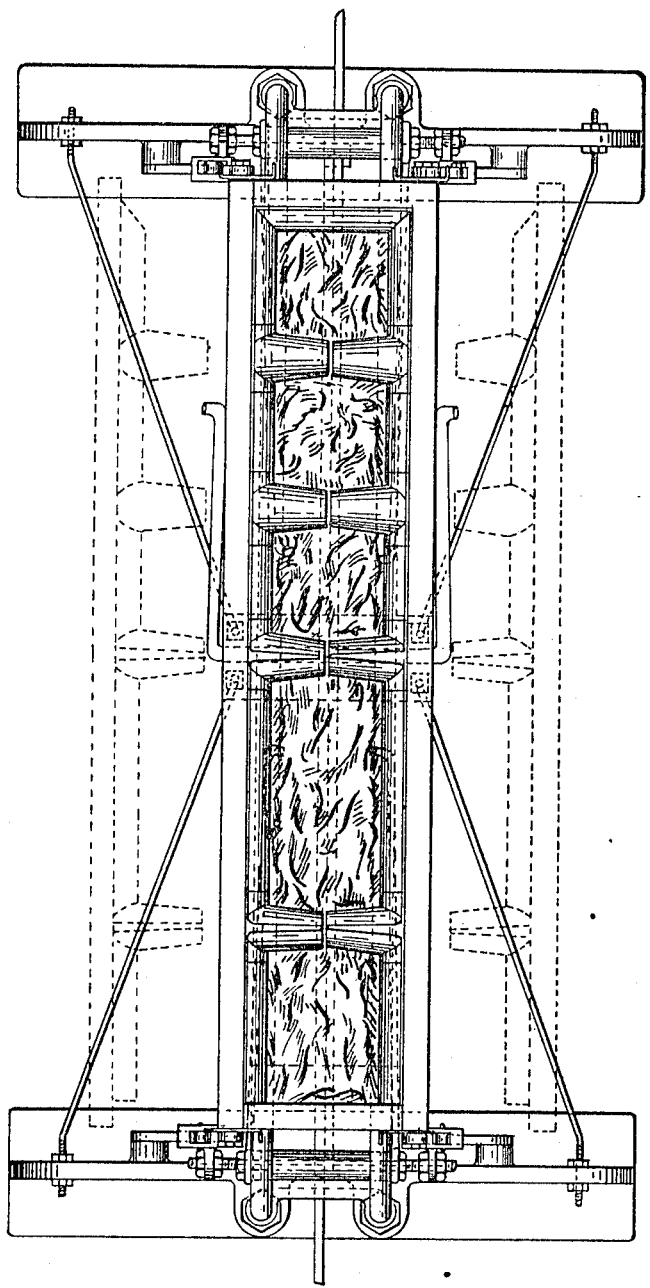

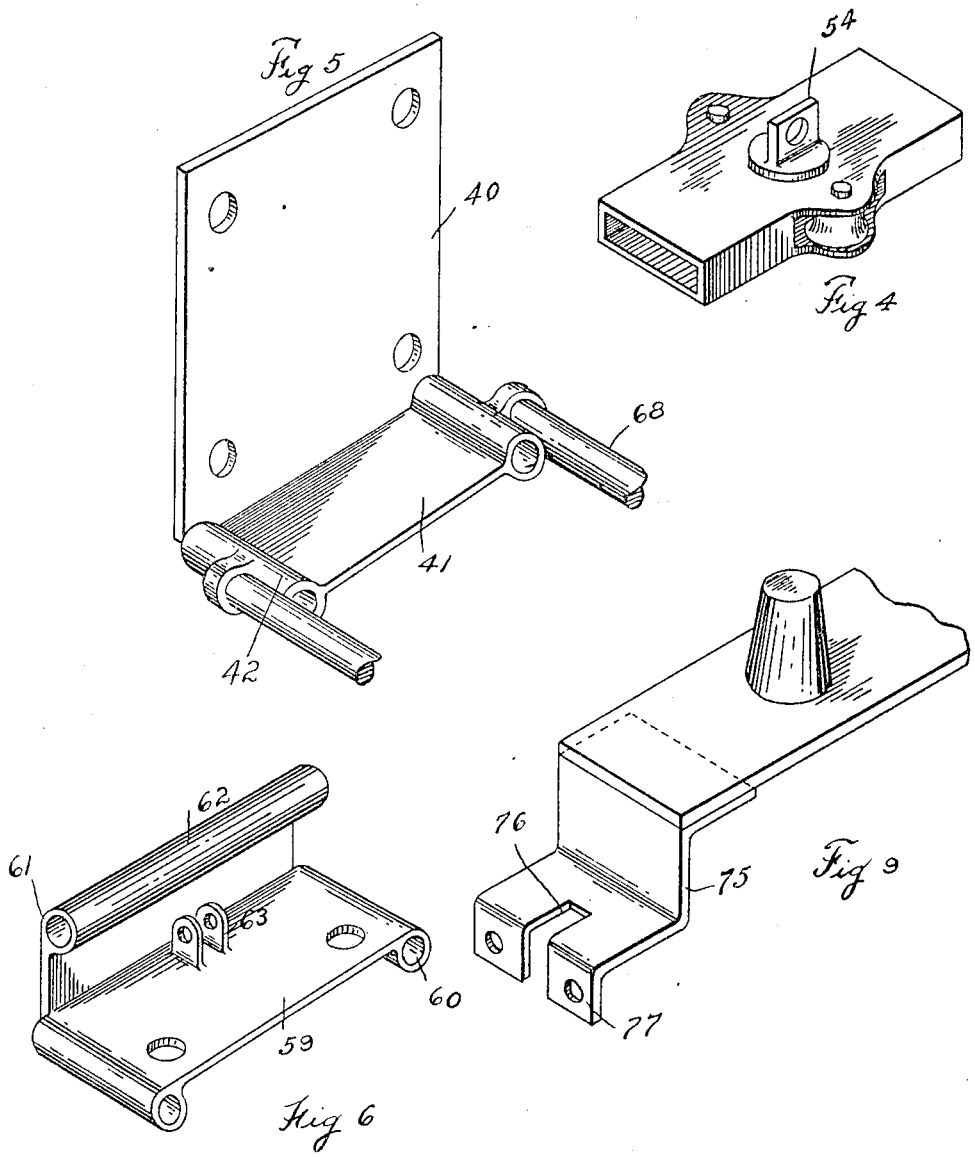

C. N. CHOATE.
CEMENT BLOCK MACHINE.
APPLICATION FILED MAR. 12, 1907.
947,569.
Patented Jan. 25, 1910.
6 SHEETS—SHEET 5.
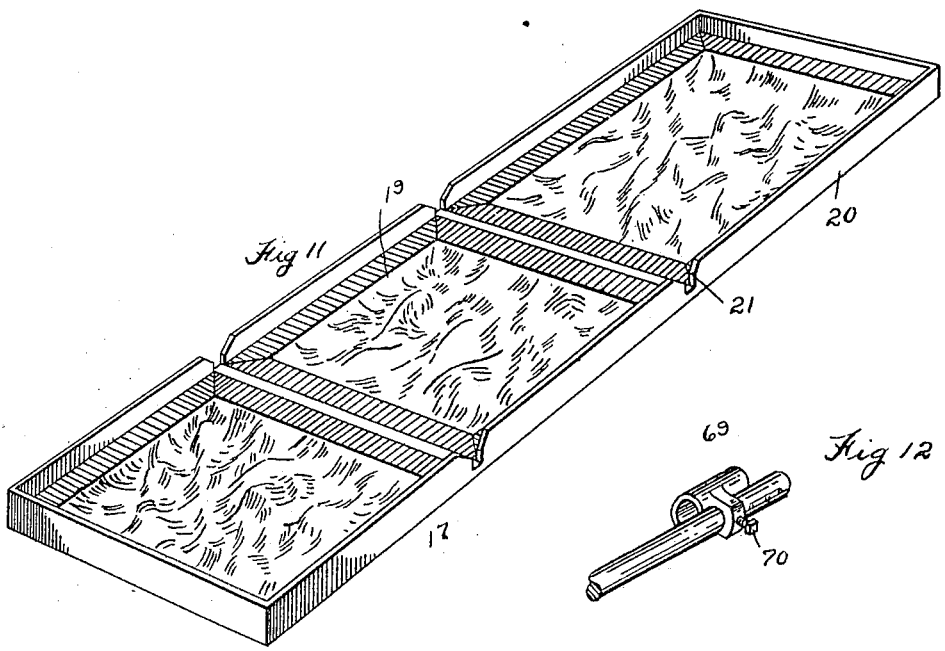
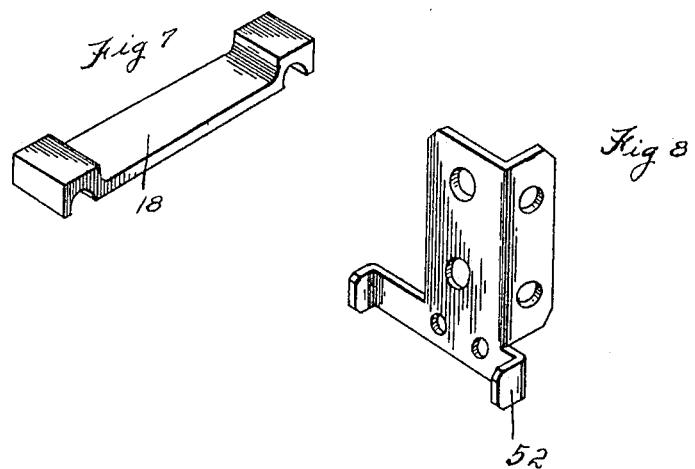

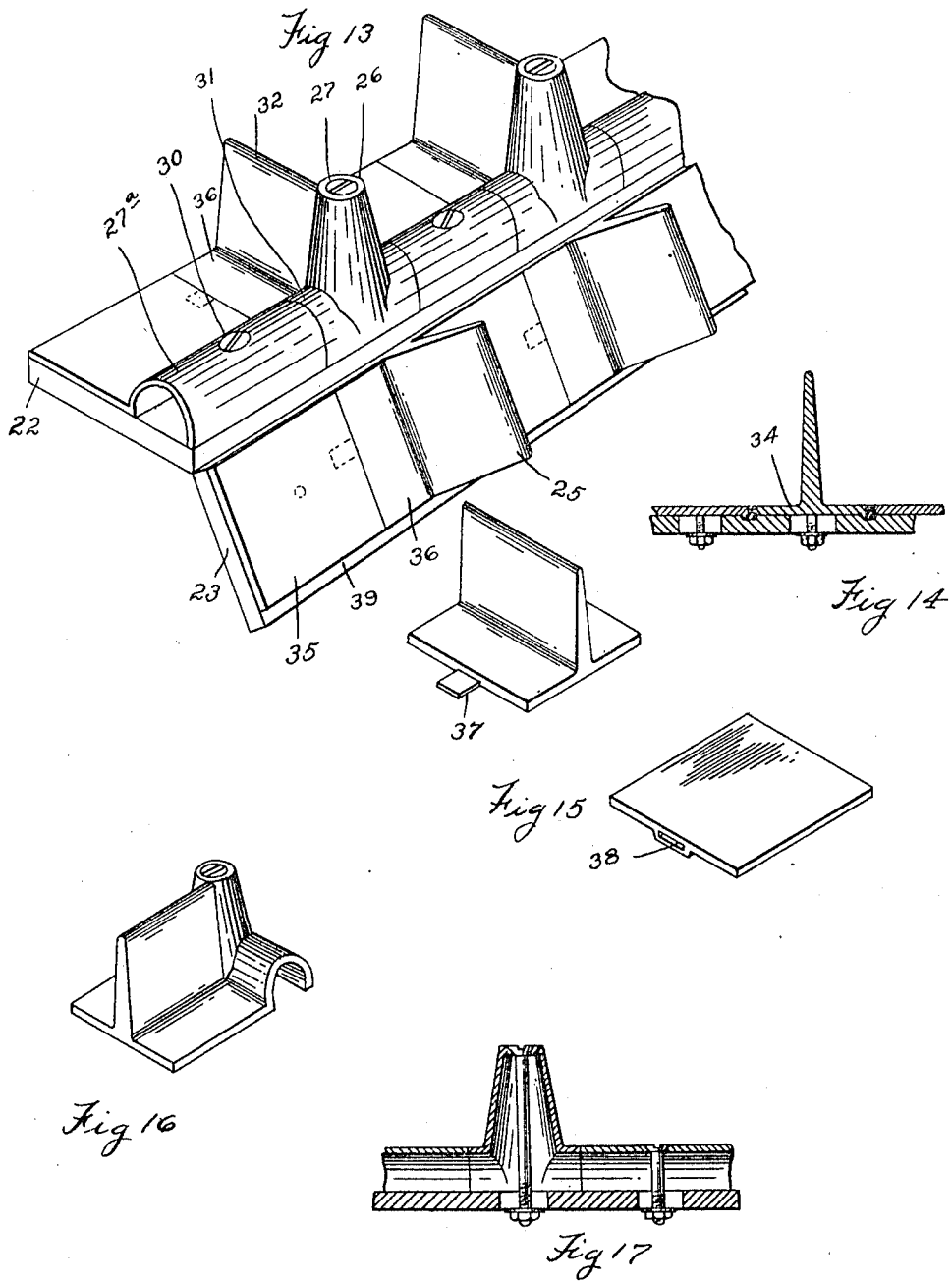

UNITED STATES PATENT OFFICE.

CHARLES N. CHOATE, OF WOODSTOCK, ONTARIO, CANADA, ASSIGNOR OF ONE-THIRD TO WALTER C. REAN AND ONE-THIRD TO SAMUEL TAGGART, OF WOODSTOCK, CANADA.

CEMENT-BLOCK MACHINE.

947,569.  Specification of Letters Patent.  Patented Jan. 25, 1910.

Application filed March 12, 1907. Serial No. 362,014.

*To all whom it may concern:*

Be it known that I, CHARLES N. CHOATE, a subject of the King of Great Britain and Ireland, residing at Woodstock, in the Province of Ontario and Dominion of Canada, have invented certain new and useful Improvements in Cement-Block Machines, of which the following is a specification, reference being had therein to the accompanying drawings.

The invention relates particularly to cement block machines of the face-down type, and consists in the novel construction of the machine, in the peculiar construction and combination of its various parts, and in certain details of construction, as will be more fully hereinafter set forth and illustrated.

Figure 1:
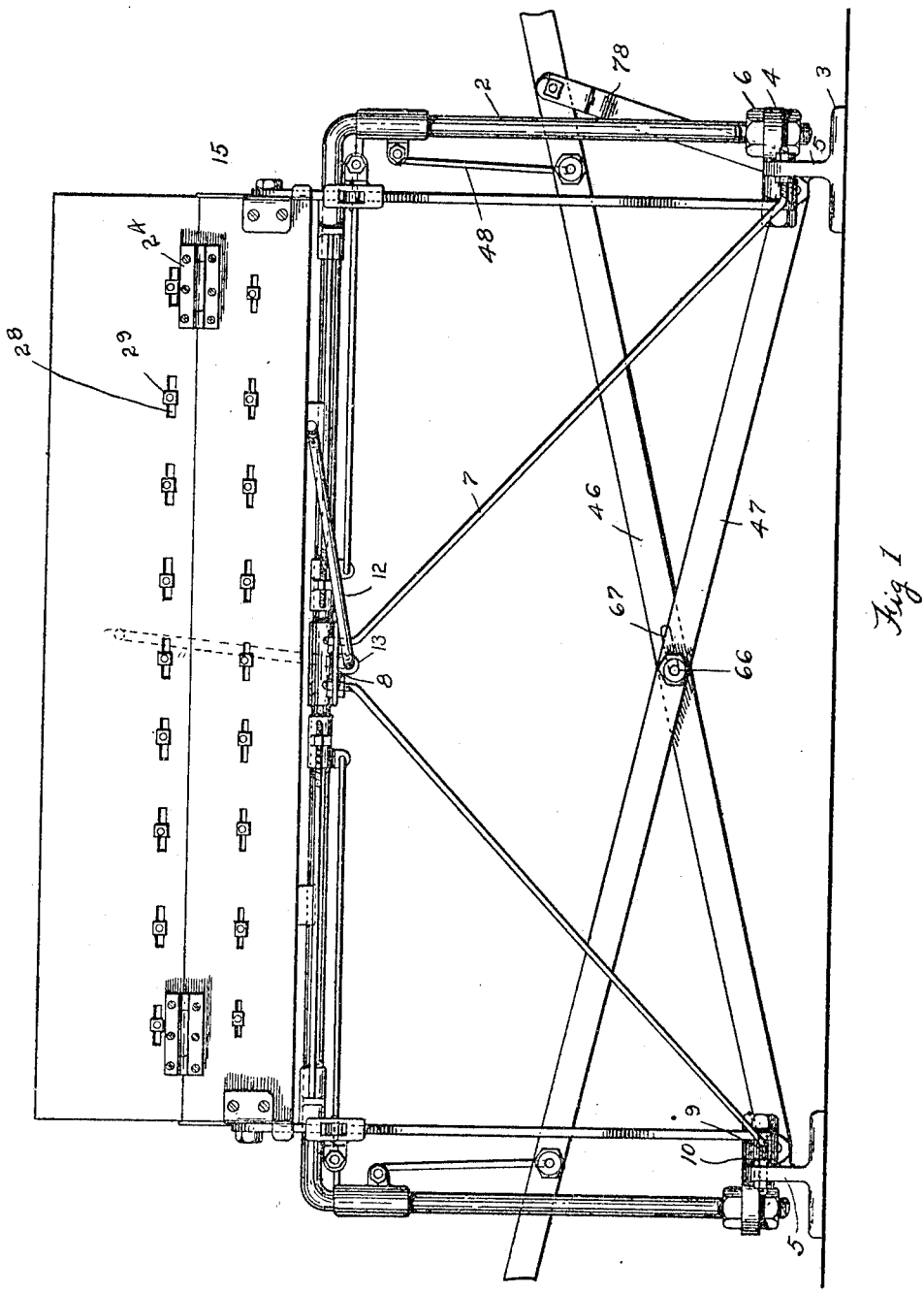
Figure 2:
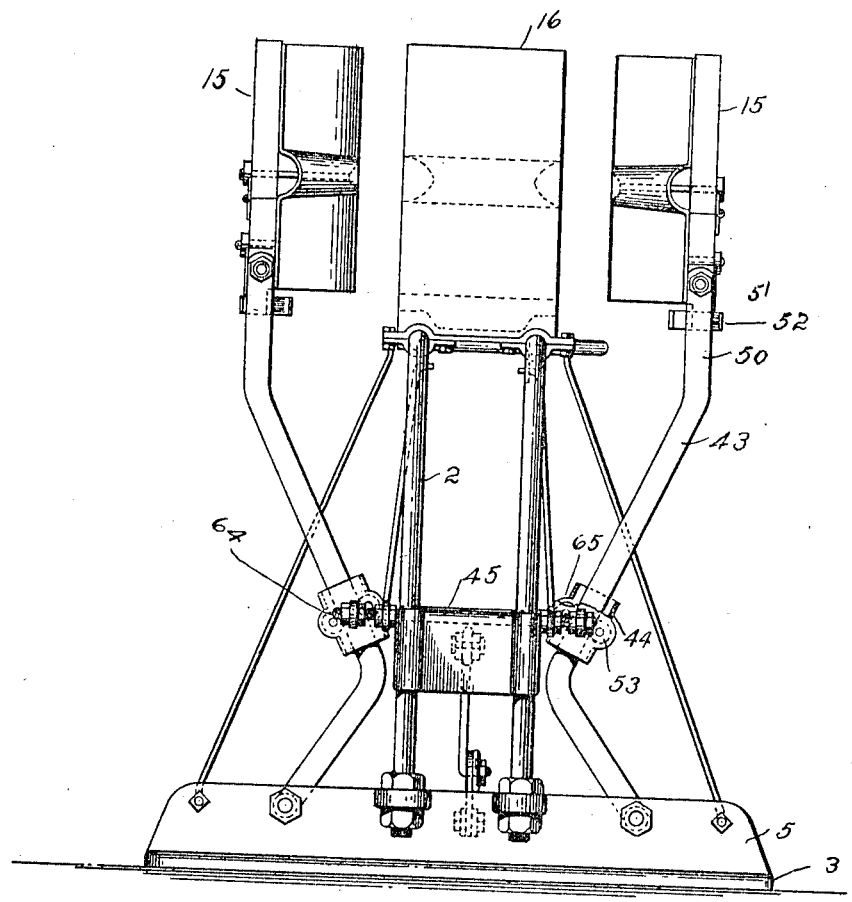
Figure 10:
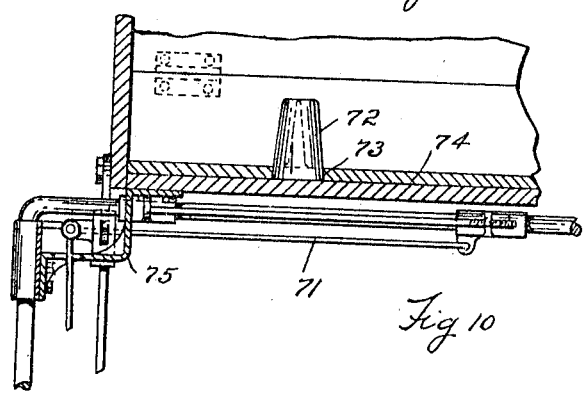

In the drawings,—Figure 1 is a side elevation of a machine embodying my invention; Fig. 2 is an end view; Fig. 3 is a plan view; Figs. 4 to 8 inclusive are detached perspective views of parts of the machine; Fig. 9 is a sectional perspective view of a modified form of core-support; Fig. 10 is a view in elevation of an end portion of the block machine, with the mold in section, showing the application of the core-support illustrated in Fig. 9; Fig. 11 is a detached perspective view of the pallet-board; Fig. 12 is a similar view of the adjusting means in the mold ends; Fig. 13 is a sectional perspective view of one of the mold sides; Fig. 14 is a section taken on line $x$—$x$ of Fig. 13; Figs. 15 and 16 are detached perspective views of parts of the mold; and Fig. 17 is a section taken on line $y$—$y$ of Fig. 13.

In construction, the block machine comprises a main supporting frame 1, consisting of a pair of parallelly-arranged and inverted U-bars 2, mounted upon base sections 3, the latter being preferably inverted T-bars, as shown, and the free ends of the supporting bars being threaded and engaging apertured lugs 4, secured to a web 5 of the base sections. Nuts 6 engage the threaded portions of the supporting bars upon opposite sides of the lugs to hold the same in place. This form of connection between the parts of the supporting frame affords means for adjusting each bar, so as to make the support, as an entirety, perfectly level for the receipt of the mold. The support is further strengthened by tie-bars or brace-rods 7, a pair being arranged on each side of the machine, as indicated in Fig. 1, the rods of each pair extending from a central supporting section 8 clamped to the bar to the base sections 3, and having offset portions 9 at their free ends, extending through webs of the base members and held thereto by nuts 10. For the purpose of providing an additional locking or securing means for the mold sides during the operation of tamping, I provide a central clamp 12,—in this instance composed of a pair of rocking arms,—journaled in bearings 13 depending from the supporting section 8. This form of clamp leaves the center of the supporting frame open, for a purpose to be hereinafter set forth, and at the same time forms the additional locking means for the molds, as previously set forth.

14 represents the mold proper, comprising sides 15 and ends 16, the mold parts being arranged, for a purpose hereinafter set forth, for lateral movement in a horizontal plane.

17 represents a pallet-board for the machine, forming the mold bottom, and seated upon detachable supporting bars 18 (Fig. 7), arranged upon the top of the main supporting frame.

The mold is especially designed for forming a multiple of blocks of any particular length desired, the block faces being formed upon the pallet-board, so that when the blocks are removed they will rest upon their face portions during the operation of curing, permitting the moisture to settle at the bottom of the block, thus producing a superior finish for the block facing. As it is frequently desired to produce a rock facing for the block, the pallet-board is constructed with a facing, as 19, to give the rock appearance, and is further provided with a marginal flange 20,—recessed along its sides, as at 21, to receive the partition plates,—which serves the double function of collecting the moisture about the rock face, and producing a well-defined and clean-cut edge for the block, giving it an attractive appearance. The flange also serves to protect the block edge during the process of curing, preventing the same from being chipped or otherwise marred.

The pallet-board being employed to form the facing of the block, the usual openings in the latter are formed by cores arranged at the sides of the block, and I have herein shown the cores as carried by the mold sides, which construction is practical by reason of the fact that the sides are adapted to move, as previously set forth, outwardly from the pallet in a horizontal plane, thus permitting the cores to be properly drawn.

In Fig. 13 is shown the preferable form of mold side employed, consisting of two complementary sections 22 and 23, formed by dividing the side longitudinally near its middle portion, the sections being connected by suitable hinges, as 24. Upon each side section are carried the partitions 25, the latter being in complementary sections adapted to meet upon the closing of the mold to divide the material therein into the proper lengths, and upon the upper section are arranged the cores 26 and 27ª, any number being employed, according to the openings desired to be formed in the block. The cores 26 are adapted to form the openings extending through the block, while the cores 27ª form the recesses in the block sides.

The cores and partitions described are necessarily shifted in their positions in the formation of different lengths of blocks, and for this purpose I have provided means for detaching and adjusting the parts upon the mold sides. The cores 26 are preferably hollow castings, through which a bolt, as 27, extends to and through an opening, as 28; in the mold side, and is secured by a nut, as 29,—a series of these openings 28 being formed in the mold, as indicated in Fig. 1. The cores 27ª are attached to the mold in a similar manner by bolts 30, any number of these cores being used as desired, made in different lengths, as shown in Fig. 13. The cores 26 also preferably carry integral therewith a core section, as 31, similar in form to the core 27ª, and also a partition section, as 32. The correspodning partition sections upon the lower section 23 of the mold are secured by means of bolts 34 to the mold in the same manner as the parts just described.

For the purpose of providing a smooth external surface for the block side, I preferably employ in connection with the cores and partitions a lining for the mold, made, as indicated, of detachable sections, as 35. Some of the lining sections, as 36, are carried by the partition sections and cores, while the others are independent and are secured to the adjoining parts by a tongue and groove connection, as indicated by the numerals 37 and 38. By this method of formation, the cores and partitions may be detached, shifted longitudinally into the desired position, and the other parts shifted, added, or withdrawn, to form the desired block. Where the lining is employed in connection with the cores and other parts described, it is cut away at its lower edge upon the lower side section to form a space 39 in which the side of the pallet-board extends, so that the wall of the block extending upwardly from the pallet-board will be unbroken, except for the recesses purposely formed therein. The ends of the mold 16 are preferably connected to and supported by a plate, as 40 (Fig. 5), attached to a horizontal plate section 41, provided with tubular bearings 42, through which extend the main supporting bars 2, the ends being adapted to slide longitudinally of the support during the operation of opening and closing the mold, as hereinafter set forth.

The operating mechanism for shifting the sides and ends is of the following construction: A pair of vertically-extending levers, as 43, is arranged at each end of the machine, their lower ends being pivoted to the base sections, and having pivotal connections at their upper ends with the mold sides, forming the supports for the latter. Sliding box-shaped sleeve sections 44 are arranged upon the levers, and vertically-reciprocating plate sections 45,—one at each end of the machine,—have a sliding engagement with the vertical portions of the support and a pivotal connection with the sleeves. The operating mechanism further includes preferably two crossed operating levers 46 and 47, connections, as 48, between said levers and the reciprocating sections 45, and an operative connection between said reciprocating sections and the ends, the mechanism described being adapted to shift both the ends and sides simultaneously to open and close the mold. The supporting levers 43, for the purpose of producing the horizontal movement of the mold sides desired, are angle-shaped in form, and provided at their upper ends with straight vertical extensions or sections 50, and to limit the extent of swinging movement of the sides upon their supports a stop, as 51 is employed (shown in detail in Fig. 8), secured to each mold side, and carrying stop members 52, engaging upon opposite sides of the supporting lever, as shown in Fig. 2. The sleeves 44 are provided each with a pair of rollers, as 53, that contact with the supporting levers during the travel of the sleeve, thus reducing the friction to a minimum, and each carries a pivot member, as 54 (Fig. 4). The reciprocating sections 45 (Fig. 6) comprise each a vertical section 59, having tubular bearings 60 engaging the support rods, and an inwardly-extending section 61 provided with a transverse tubular bearing 62, and also a pair of apertured lugs 63 upon the main section and in proximity to the horizontal portion. A connecting bolt, as 64, extends through the bearing 62 of the reciprocating section, and through the pivot members 54 upon the sleeves, forming an operative connection between the latter and the reciprocating member. The bolt is also proportioned to extend some little distance at each end beyond its bearing, so that adjusting washers, as 65, may be employed, by means of which the supporting levers 43 may be drawn closer together, or spread farther apart, thereby increasing or diminishing the width of the mold as may be desired.

The main operating levers previously referred to are preferably two in number, so that the machine may be operated at either end, as desired, the levers being pivoted at their inner ends to the base sections 3, as shown in Fig. 1, and projecting in opposite directions beyond the machine ends, forming operating handles. The levers are pivotally connected at their center by a bolt 66, and one of the levers is slotted, as at 67, to permit of their operation. The connection 48 is in the form of a rod, pivoted one to each lever near the end of the machine, and at its upper end between the ears 63 upon the reciprocating member 45.

The operative connection between the mold ends and the operating mechanism described comprises a pair of rods, as 68, for each end, secured at their outer ends to the plate sections 41, and having a sliding engagement at their opposite ends in bearings 69 upon the transverse portions of the supporting rods 2.

70 represent set-screws employed for clamping the rods 68 to the bearings 69, and permitting such adjustment of the mold ends as may be desired.

In Fig. 10 I have shown a modified form of core-support that may be employed in connection with the machine when it is not desired to employ the pallet-board for facing the block. It consists of a supporting plate proper 71, of a length to extend from end to end of the mold, upon which are located vertically-projecting cores 72 (openings, as 73, being formed in the pallet-board 74 to permit of the extension of the cores into the mold), and angle-shaped brackets 75 at the ends of the core-support, slotted as at 76 to receive the connecting rods 48, attached at their ends 77 to the reciprocating sections 45. Upon the operation of the machine this modified form of support reciprocates vertically, this movement being permissible by reason of the center of the main supporting frame being open for that purpose.

Upon the raising or depression of either of the main operating levers, according as the mold is desired to be opened or closed, the mold sections are moved simultaneously, and if the mold is being opened the cores and partitions are withdrawn, permitting the block to be removed upon the pallet-board. Upon the reverse movement of a single-operating lever the parts are closed.

During the filling of the mold, the upper sections of the mold sides may be thrown backward, carrying with them the cores, which permits of the filling of half the mold with the cementitious material, and the necessary tamping, without interfering with the cores, thus facilitating the formation of the block to a considerable extent. The hinged sides of the mold are then thrown into place, and the central clamp upon the supporting frame moved into proper engagement, when the completion of the filling of the mold may be effected.

Attention is directed to the fact that one of the essential features of the invention is the movement of the mold sides in a horizontal plane, and while I have shown and described one form of mechanism that will accomplish this result I do not desire to be limited to the same, although I deem it preferable in use, by reason of its simplicity of construction. Further attention is directed to the fact that during the closing of the mold, the vertically-reciprocating sleeve members upon the levers 43 travel upwardly upon said levers upon the vertical portions 50, in which position these sleeves serve as locks, holding the levers from outward spreading movement. The mold sides are thus automatically locked in their closed position.

As illustrated, the machine is of a construction to be operated at either end, as set forth, but it will be obvious that only a single operating lever may be used if desired.

Locking means may also be used for preventing movement of the operating mechanism after the mold sides and ends have been brought together in their closed position. The means employed is in the form of a depending lever 78, pivoted upon the handle section of either or both of the main operating levers, and of a length to abut against the base section 3 when the lever is in its elevated position. The parts are shown locked in Fig. 1, and for unlocking it is merely required to move the locking lever 78 out of contact with the support, when the lever may be depressed.

What I claim as my invention is,—

1. In a block molding apparatus, a supporting frame comprising parallelly disposed inverted U-shaped bars, end walls sleeved upon the horizontal portions of said bars, reciprocating members slidably mounted upon the vertical portions of said bars, and connections between said reciprocating members and said end walls.

2. In a block molding machine, a supporting frame including vertically disposed end portions and horizontally disposed top bars, end walls sleeved on said top bars and slidable thereon, swinging side walls mounted on the supporting frame, and a single means for actuating said side and end walls to open and close the mold.

3. In a block molding machine, a supporting frame including vertically disposed end portions and horizontally disposed top bars, end walls sleeved on said top bars and slidable thereon, swinging side walls carried by said supporting frame, reciprocating members slidably mounted on the end portion of the supporting frame, and connections between said reciprocating members and said side and end walls.

4. In a block molding machine, a supporting frame, rocking supports pivoted to said frame, mold walls carried by said supports, sleeves engaging said rocking supports, and means for shifting said sleeves.

5. In a block molding machine, a supporting frame, rocking supports pivoted to said frame, mold walls carried by said supports, a reciprocating member mounted in said frame, and sleeves carried by said reciprocating member and engaging said rocking supports.

6. In a block molding machine, a supporting frame, rocking supports pivoted to said frame, mold walls carried by said supports, adjustably connected sleeves engaging said rocking supports, and means for shifting said sleeves.

7. In a block molding machine, a supporting frame, rocking supports pivoted to said frame, mold walls carried by said rocking supports, a reciprocating member mounted in said frame, sleeves carried by said reciprocating member and engaging said rocking supports, and means for adjusting said sleeves relatively to each other.

8. In a block molding machine, a supporting frame, end walls mounted thereon, rocking supports pivoted to said supporting frame, side walls pivotally supported upon said rocking supports and means for actuating said rocking supports to move the side walls into and out of operative position.

9. In a block molding machine, a supporting frame including end portions and spaced horizontally disposed top bars, the pallet board support resting upon the top bars of said frame, end walls sleeved upon the top bars of said frame and slidable thereon, and swinging side walls carried by said supporting frame.

10. In a block molding machine, a supporting frame, rocking supports carried thereby, mold side walls carried by said supports, end walls movably supported in said supporting frame, reciprocating members mounted in the ends of the supporting frame, sleeves adjustably secured to said reciprocating members and engaging said rocking supports, and links adjustably connecting said reciprocating members and said end walls.

11. In a block molding machine, the combination with a supporting frame, of a mold having movable sides, rocking supports pivotally connected to mold sides, a reciprocating member upon the supporting frame, means for reciprocating said member, and operative connections between said reciprocating member and the rocking supports.

12. In a block molding machine, the combination with a mold having laterally movable sides, of rocking supports for and having pivotal connections with the sides, whereby said sides may always lie in a vertical plane during the movement of said supports, and means for shifting said rocking supports.

13. In a block molding machine, the combination with a supporting frame of a mold having movable side and end walls, rocking supports for and having pivotal connections with the side walls, whereby said side walls may always be maintained in a vertical plane during the movement thereof, and actuating mechanism for shifting said rocking supports and simultaneously shifting the mold ends.

14. In a block molding machine, the combination with a main supporting frame, of a mold having movable ends and sides, a pair of rocking levers at each end of the frame upon which the mold sides are mounted, reciprocating members upon the frame ends, connections between each member and its respective pair of rock levers, an operative connection between each mold end and the adjoining reciprocating member, a main operating lever pivoted to the supporting frame, and connections between said lever and the reciprocating members.

15. In a block molding machine, the combination with a support, of a pair of rock levers at each end thereof, a mold having its sides pivotally mounted upon the rock levers, means for rocking said levers, and adjusting means for varying the distance between each pair of levers.

16. In a block molding machine, the combination with a main supporting frame, of a vertically reciprocating member at each end thereof, a pair of rock levers adjoining, and pivotally connected, to each reciprocating member, two crossed operating levers pivoted to the frame and extending each beyond said frame at one end forming an operating handle, an operative connection between said levers, a connection between each of said levers and the adjoining reciprocating member, and a mold having its sides mounted upon the rock levers.

17. In a block molding machine, the combination with a support, of a mold thereon having laterally-movable ends and sides, a pair of rock levers at each end of the support upon which the mold sides are mounted, a traveling member for each of the levers, reciprocating members at the support ends, adjustable connections between the traveling and reciprocating members, and means for simultaneously actuating the reciprocating members.

18. In a block molding machine, a mold comprising end walls and side walls, said side walls being each longitudinally divided into complementary sections, and complementary cores carried by the upper sections of the sides.

19. In a block molding machine, a mold comprising end and side walls, said side walls each divided longitudinally into sections hinged together, and complementary cores carried by the upper sections of the sides.

20. In a block molding machine, a mold having ends, and sides each divided longitudinally into sections hinged together, and a core or cores carried by the upper sections of the sides.

In testimony whereof I affix my signature in presence of two witnesses.

CHARLES N. CHOATE.

Witnesses:
J. G. WALLACE,
A. M. YOUNG.